(12) United States Patent
Hatanaka

(10) Patent No.: US 6,727,684 B2
(45) Date of Patent: Apr. 27, 2004

(54) MAGNETIC FIELD SENSOR (75) Inventor: Tadata Hatanaka, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/191,520

(22) Filed: Jul. 10, 2002

(65) Prior Publication Data
US 2003/0020470 A1 Jan. 30, 2003

(30) Foreign Application Priority Data
Jul. 26, 2001 (JP) ..................... 2001-225685

(51) Int. Cl.[7] ............................... G01R 33/07
(52) U.S. Cl. ................... 324/117 H; 324/251; 324/235; 324/117 R; 324/207.2; 327/185; 327/205
(58) Field of Search ................... 324/251, 235, 324/51, 117 R, 117 H, 158.1, 207.2; 338/32 H; 327/511, 185, 205

(56) References Cited

U.S. PATENT DOCUMENTS

| | | | | |
|---|---|---|---|---|
| 3,816,766 A | * | 6/1974 | Anselmo et al. | 327/187 |
| 4,037,150 A | | 7/1977 | Taranov et al. | 324/251 |
| 4,296,410 A | * | 10/1981 | Higgs et al. | 340/679 |
| 5,442,283 A | * | 8/1995 | Vig et al. | 324/207.2 |
| 5,604,433 A | * | 2/1997 | Theus et al. | 324/251 |
| 5,619,137 A | | 4/1997 | Vig et al. | 324/251 |
| 5,621,319 A | | 4/1997 | Bilotti et al. | 324/251 |
| 5,844,427 A | | 12/1998 | Theus et al. | 324/51 |

FOREIGN PATENT DOCUMENTS

| | | |
|---|---|---|
| JP | 7-83699 | 3/1995 |
| JP | 08-201491 | 8/1996 |
| WO | WO 99/21023 | 4/1999 |

* cited by examiner

Primary Examiner—N. Le
Assistant Examiner—Vincent Q. Nguyen
(74) Attorney, Agent, or Firm—McDermott, Will & Emery (57) ABSTRACT A magnetic field sensor includes: a Hall element; a voltage amplifier for amplifying an output voltage from the Hall element so as to output an amplified signal; a voltage comparison circuit for receiving the amplified signal; a switch circuit provided between the voltage amplifier and the voltage comparison circuit for inverting a polarity of the amplified signal; and a latch circuit for holding an output signal from the voltage comparison circuit. The voltage comparison circuit inverts a polarity of a hysteresis voltage that determines a reference value of a magnetic field intensity in response to a first synchronizing signal, which triggers a detection of a magnetic field, and a second synchronizing signal following the first synchronizing signal.

5 Claims, 8 Drawing Sheets

MAGNETIC FIELD SENSOR

BACKGROUND OF THE INVENTION

The present invention relates to a magnetic field sensor capable of detecting an intensity of a magnetic field independently of the polarity of the magnetic field.

In a magnetic field sensor, a voltage is generated between output terminals of a Hall element by the Hall effect in proportion to the density of a magnetic flux passing through the Hall element, the generated voltage is amplified by an amplifier, and whether or not the intensity of the detected magnetic field is greater than a predetermined magnetic field intensity is determined by a comparator, using the amplified signal.

Usually, a magnetic field sensor is produced by monolithically integrating bipolar transistors or CMOS devices. One factor that dictates the performance of a magnetic field sensor product is the scattering in a detection value occurring while the detected magnetic field is converted into a voltage and subjected to a comparison. There are two primary causes of the scattering, one being a Hall element offset signal component, which is caused by, for example, a stress from an encapsulation package, and the other being an input-offset signal component to the amplifier.

A method for compensating for the Hall element offset signal component is shown in U.S. Pat. No. 4,037,150. The method shows a Hall element having geometrically equivalent four terminals, or two pairs of output terminals, the output terminals of each pair opposing each other. The potential differences between one pair of output terminals and between the other pair thereof are output alternately in response to the first phase and the second phase, respectively, of a synchronizing signal that triggers a detection operation, and then the sum of the output values is obtained. In this way, the effective signal value is doubled because the effective signal components are of the same phase, and the offset signal components are canceled out by each other because they are of the opposite phases.

Another factor that determines the performance of a magnetic field sensor product is whether it is capable of a bipolar detection, i.e., detecting a magnetic field irrespective of the polarity of a magnet built in the product. If the magnetic field intensity can be determined irrespective of the polarity of a magnet, it is no longer necessary, in a position sensor, or the like, having a magnet and a Hall IC being built therein, to manage the direction of the magnet when determining the position of the magnet.

Figure 8:
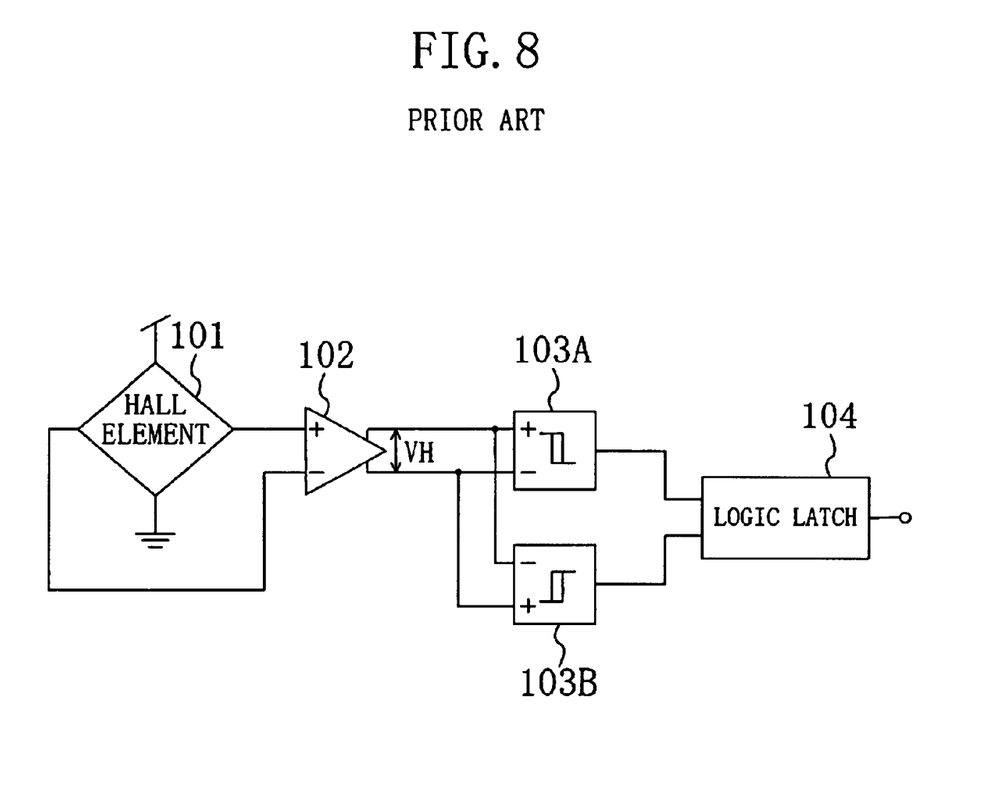
FIG. 8 is a diagram illustrating a configuration of a conventional magnetic field intensity determination circuit capable of performing a bipolar determination operation.

FIG. 8 shows a conventional magnetic field sensor disclosed in Japanese Laid-Open Patent Publication No. 7-83699, which is capable of a bipolar determination of a magnetic field intensity.

As illustrated in FIG. 8, the conventional magnetic field sensor has a Hall element 101; a voltage amplifier 102 for amplifying the output voltage from the Hall element 101; a first Schmitt trigger circuit 103A for receiving the output voltage from the voltage amplifier 102 and outputting different output voltages based on the threshold value thereof; a second Schmitt trigger circuit 103B for receiving the output voltage from the voltage amplifier 102 while the polarity thereof is inverted from the polarity of the input signal to the first Schmitt trigger circuit 103A; and a logic latch circuit 104 for receiving and latching the output signals from the first Schmitt trigger circuit 103A and the second Schmitt trigger circuit 103B.

First, the voltage amplifier 102 amplifies a Hall voltage that is generated between output terminals of the Hall element 101 in proportion to a density of the magnetic flux passing through the Hall element 101 to obtain an amplified voltage VH.

Then, the amplified voltage VH is input to the first Schmitt trigger circuit 103A and the second Schmitt trigger circuit 103B, each of which determines whether the value of the amplified voltage VH is greater than a predetermined voltage value so as to output a determination value. The first Schmitt trigger circuit 103A and the second Schmitt trigger circuit 103B are equivalent to each other, and the detection of a magnetic field intensity level for the north polarity and that for the south polarity are performed separately by using the two Schmitt trigger circuits 103A and 103B, with input signals of the opposite polarities, respectively.

The output values of the first and the second Schmitt trigger circuits 103A and 103B are input to the logic latch circuit 104. Then, the logic latch circuit 104 outputs an output value obtained by performing an operation on the output values from the two Schmitt trigger circuits 103A and 103B corresponding to a magnetic field intensity for the north polarity and a magnetic field intensity for the south polarity. The output value from the logic latch circuit 104 is a binary value that is irrespective of the polarity and that indicates whether the intensity of the detected magnetic field is greater than that of a predetermined magnetic field.

However, the conventional magnetic field sensor involves difficulties in reducing both the circuit scale and the current consumption thereof because it requires two Schmitt trigger circuits as voltage comparison circuits that perform a bipolar detection of magnetic field intensity irrespective of the polarity of the magnetic field.

SUMMARY OF THE INVENTION

The present invention has its object of solving the problems in the prior art by enabling a bipolar detection of a magnetic field intensity irrespective of the polarity of the magnetic field with a simple configuration and with a reduced current consumption.

In order to achieve the object, the present invention provides a magnetic field sensor in which a switch circuit for inverting the polarity of a Hall voltage is provided in a stage preceding a voltage comparison circuit that compares an amplified Hall voltage with a reference voltage, wherein the voltage comparison circuit inverts the polarity of a hysteresis voltage that determines a reference value of a magnetic field intensity in response to first and second synchronizing signals.

Specifically, a first magnetic field sensor of the present invention includes: a Hall element; a voltage amplifier for amplifying an output voltage from the Hall element so as to output an amplified signal; a voltage comparison circuit for receiving the amplified signal; a switch circuit provided between the voltage amplifier and the voltage comparison circuit for inverting a polarity of the amplified signal; and a latch circuit for holding an output signal from the voltage comparison circuit, wherein the voltage comparison circuit inverts a polarity of a hysteresis voltage that determines a reference value of a magnetic field intensity in response to a first synchronizing signal, which triggers a detection of a magnetic field, and a second synchronizing signal following the first synchronizing signal.

With the first magnetic field sensor, a bipolar voltage comparison can be made with a single voltage comparator irrespective of the polarity of the magnetic field, whereby the magnetic field intensity can be detected with a simple form and with a reduced current consumption.

In the first magnetic field sensor, it is preferable that the latch circuit includes a first flip-flop circuit and a second flip-flop circuit for receiving binary values in response to the first synchronizing signal and the second synchronizing signal, respectively, so as to hold an operated value, which is obtained by an operation on the binary values, in response to the second synchronizing signal as an output value.

A second magnetic field sensor of the present invention includes: a Hall element including two pairs of external terminals; a first switch circuit connected to the two pairs of external terminals for selecting one of the two pairs of external terminals as output terminals; a voltage amplifier for amplifying an output voltage of the Hall element receiving via the first switch circuit and outputting an amplified signal; a memory device for storing the amplified signal; a second switch circuit provided between the voltage amplifier and the memory device for opening or closing a connection to the memory device; a voltage comparison circuit for receiving the amplified signal; a third switch circuit provided between the voltage amplifier and the voltage comparison circuit for inverting a polarity of the amplified signal; and a latch circuit for holding an output signal from the voltage comparison circuit, wherein: in response to a first synchronizing signal, which triggers a detection of a magnetic field, the first switch circuit selects one of the two pairs of external terminals of the Hall element as input terminals and the other one of the two pairs of external terminals of the Hall element as output terminals, with the second switch circuit being closed; in response to a second synchronizing signal following the first synchronizing signal, the first switch circuit selects the one of the two pairs of external terminals of the Hall element as output terminals and the other one of the two pairs of external terminals of the Hall element as input terminals, with the second switch circuit being opened, thereby inputting, to the voltage comparison circuit, a sum of a first amplified signal, which has been stored in the memory device, and a second amplified signal from the voltage amplifier; in response to a third synchronizing signal following the second synchronizing signal, the third switch circuit inverts a polarity of the sum of the first amplified signal and the second amplified signal; and the voltage comparison circuit inverts a polarity of a hysteresis voltage that determines a reference value of a magnetic field intensity in response to the second synchronizing signal and the third synchronizing signal as triggers.

With the second magnetic field sensor, effects as those of the first magnetic field sensor can be obtained. Moreover, the Hall element offset signal component can be compensated for by using the pair of output terminals for the first and the second synchronizing signals since the second magnetic field sensor includes the first switch circuit connected to the two pairs of external terminals of the Hall element for selecting one of the two pairs of external terminals as output terminals. Moreover, the input offset signal component of the voltage amplifier can be compensated for because the second magnetic field sensor further includes the memory device for storing the amplified signal from the voltage amplifier, the second switch circuit provided between the voltage amplifier and the memory device for opening or closing the connection to the memory device, and the third switch circuit provided between the voltage amplifier and the voltage comparison circuit for inverting the polarity of the amplified signal, wherein the third switch circuit inverts the polarity of the sum of the first amplified signal and the second amplified signal in response to the third synchronizing signal.

In the second magnetic field sensor, it is preferable that the latch circuit includes a first flip-flop circuit and a second flip-flop circuit for receiving binary values in response to the second synchronizing signal and the third synchronizing signal, respectively, so as to hold an operated value, which is obtained by performing an operation on the binary values, in response to the third synchronizing signal as an output value.

In the second magnetic field sensor, it is preferable that the memory device includes a capacitor.

BRIEF DESCRIPTION OF THE DRAWINGS

FIG. 3A and FIG. 3B each illustrate an output voltage waveform of a Schmitt trigger circuit in the magnetic field sensor according to the first embodiment of the present invention, wherein

DETAILED DESCRIPTION OF THE INVENTION

First Embodiment

The first embodiment of the present invention is described below with reference to the drawings.

Figure 1:
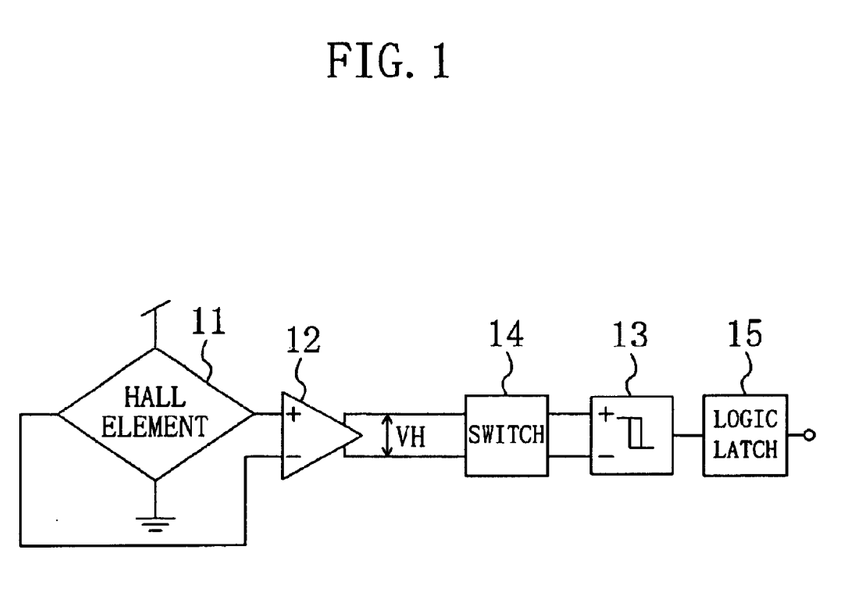
FIG. 1 is a diagram illustrating a form of a magnetic field sensor according to the first embodiment of the present invention.

FIG. 1 illustrates a functional form of a magnetic field sensor according to the first embodiment of the present invention. As illustrated in FIG. 1, the magnetic field sensor of the first embodiment includes a Hall element 11 for generating a Hall voltage in proportion to the density of a magnetic flux passing therethrough; a voltage amplifier 12 for amplifying the output voltage from the Hall element 11; a Schmitt trigger circuit 13, as a voltage comparison circuit, for receiving the amplified signal from the voltage amplifier 12 and outputting different output voltages based on the threshold value thereof; a switch circuit 14 provided between the voltage amplifier 12 and the Schmitt trigger circuit 13 for inverting the polarity of the amplified signal; and a logic latch circuit 15 for receiving and latching the output signal from the Schmitt trigger circuit 13.

An operation of the magnetic field sensor having such a form is described below.

Figure 2:
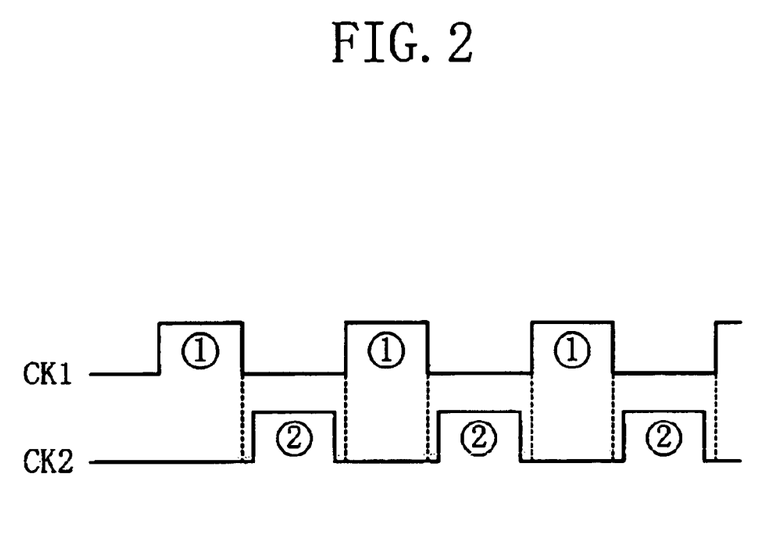
FIG. 2 is a timing chart illustrating synchronizing signals used in the magnetic field sensor according to the first embodiment of the present invention.

FIG. 2 is a timing chart illustrating a first synchronizing signal CK1, which triggers the detection of a magnetic field intensity by the magnetic field sensor of the first embodiment, and a second synchronizing signal CK2 following the first synchronizing signal CK1.

Figure 3A:
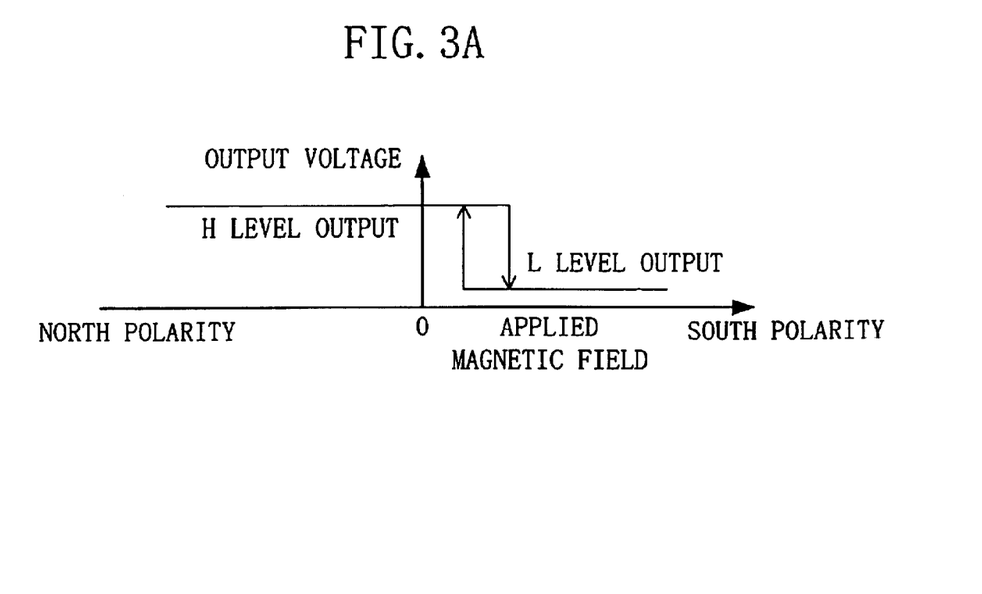
FIG. 3A is a graph in a case where the south polarity is to be detected.

First, in the first phase where the first synchronizing signal CK1 is ON while the second synchronizing signal CK2 is OFF (see FIG. 2), the amplified voltage VH in proportion to the output voltage (Hall voltage) from the Hall element 11 is generated at the output terminals of the voltage amplifier 12. The Schmitt trigger circuit 13 receives the amplified voltage VH via the switch circuit 14. Herein, the south polarity is detected, as illustrated in FIG. 3A. Then, an output value that shows whether the intensity of the detected magnetic field is greater than the intensity of a predetermined magnetic field is input to the logic latch circuit 15, and the logic latch circuit 15 latches the output value at the end of the first phase.

Figure 3B:
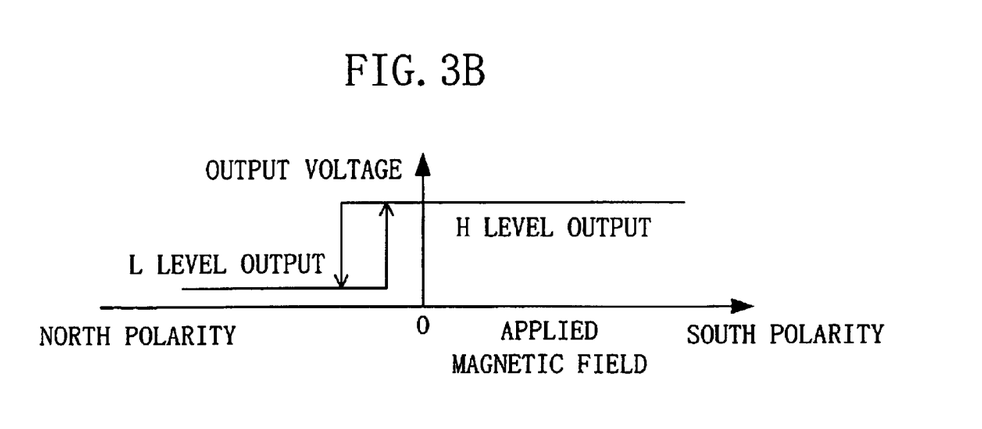
FIG. 3B is a graph in a case where the north polarity is to be detected.

Then, in the second phase where the first synchronizing signal CK1 is OFF and the second synchronizing signal CK2 is ON (see FIG. 2), the amplified voltage VH output from the voltage amplifier 12 is input to the Schmitt trigger circuit 13 while the polarity thereof is inverted by the switch circuit 14 from that in the first phase. Therefore, the polarity of the detected magnetic field is the north polarity, i.e., opposite to that in the first phase. Moreover, the polarity of the predetermined magnetic field, which is determined in the Schmitt trigger circuit 13, is also inverted. Therefore, an output value can be obtained that indicates whether or not the intensity of the detected magnetic field is greater than the intensity of the predetermined magnetic field for the north polarity, as illustrated in FIG. 3B, and the output value is input to the logic latch circuit 15. Note that while the south polarity and the north polarity are detected in the first and second phases, respectively, this may be reversed.

Figure 4:
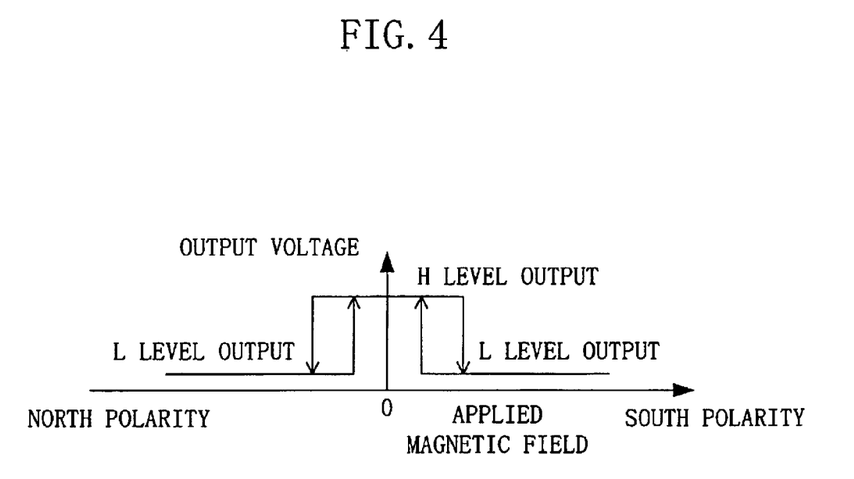
FIG. 4 is a graph illustrating an output voltage waveform of a logic latch circuit in the magnetic field sensor of the first embodiment or the second embodiment of the present invention.

Then, in the logic latch circuit 15, the output values from the Schmitt trigger circuit 13 in the first and second phases, i.e., two output values indicating whether the intensity of the detected magnetic field is greater than that of the predetermined magnetic field for the north polarity and the south polarity, illustrated in FIG. 3A and FIG. 3B, respectively, are subjected to an operation to obtain a desired output value. Therefore, at the end of the second phase, the operated value is latched, thus obtaining a binary output value that indicates whether or not the intensity of the detected magnetic field is greater than that of the predetermined magnetic field irrespective of the polarity of the magnetic field, as illustrated in FIG. 4.

As described above, the magnetic field sensor of the first embodiment can be realized only with a single voltage comparison circuit (Schmitt trigger circuit 13), whereby it is possible to reduce the circuit scale and the current consumption.

Second Embodiment

The second embodiment of the present invention will now be described with reference to the drawings.

Figure 5:
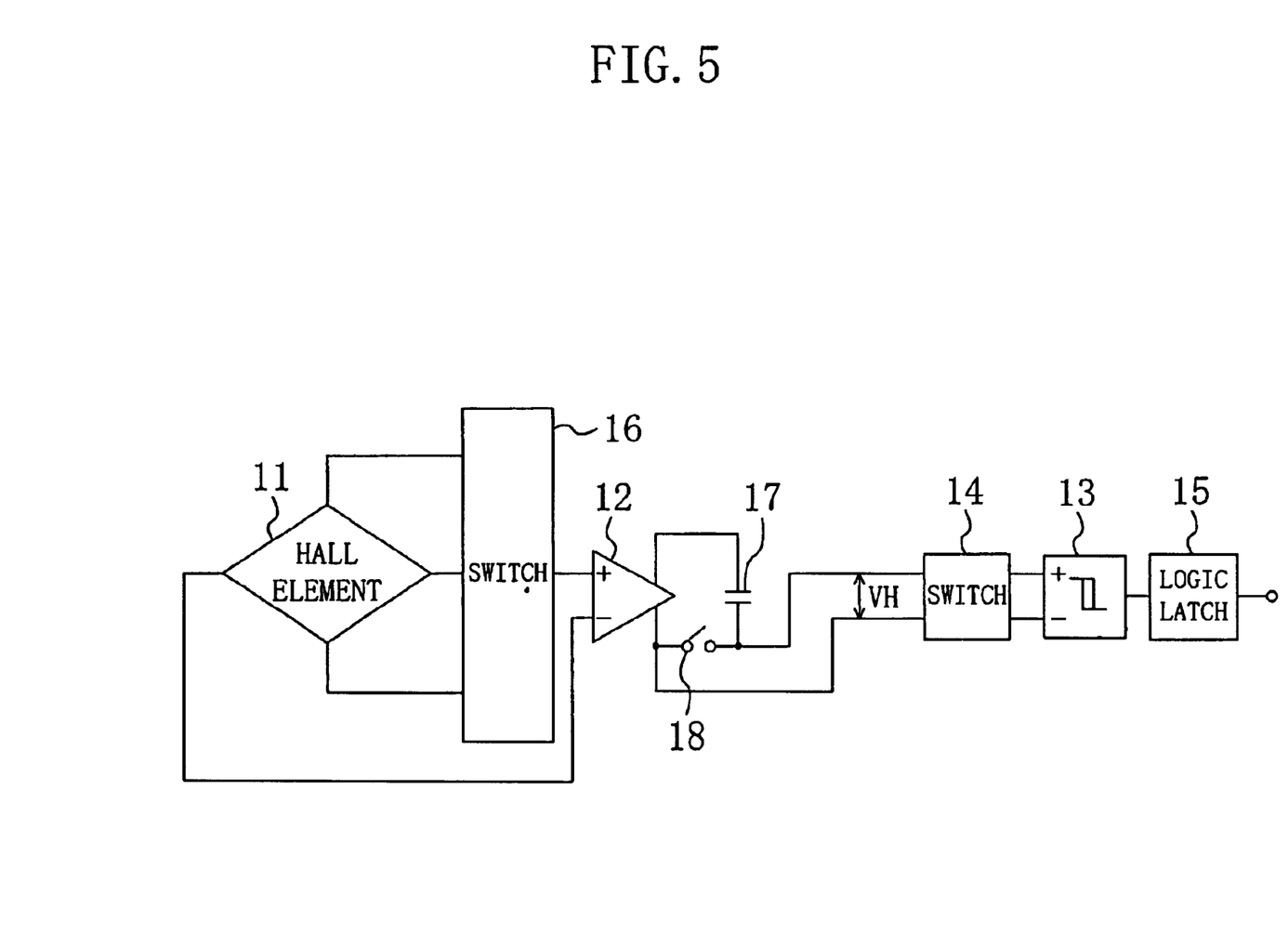
FIG. 5 is a diagram illustrating a configuration of the magnetic field sensor according to the second embodiment of the present invention.

FIG. 5 is a circuit configuration of a magnetic field sensor according to the second embodiment of the present invention. In FIG. 5, like elements to those illustrated in FIG. 1 are denoted by like reference numerals, and those elements will not be further described below. Herein, a switch circuit denoted by reference numeral 14 will be referred to as the "second switch circuit".

As illustrated in FIG. 5, the magnetic field sensor of the second embodiment is similar to that of the first embodiment, and further includes a first switch circuit 16, a memory device 17 made of a capacitor, and a third switch circuit 18. The first switch circuit 16 is provided between the Hall element 11, which includes geometrically equivalent four terminals, and the voltage amplifier 12. The first switch circuit 16 selects one of two pairs of output terminals of the Hall element 11 as input terminals and the other pair of the output terminals of the Hall element 11 as output terminals, with the output terminals of each pair opposing each other diagonally. The memory device 17 is provided between the voltage amplifier 12 and the second switch circuit 14 for storing (holding) the amplified signal from the voltage amplifier 12. The third switch circuit 18 opens or closes the connection of one output terminal of the voltage amplifier 12 to one electrode of the memory device 17 and one input terminal of the second switch circuit 14.

An operation of the magnetic field sensor having such a form is described.

Figure 6:
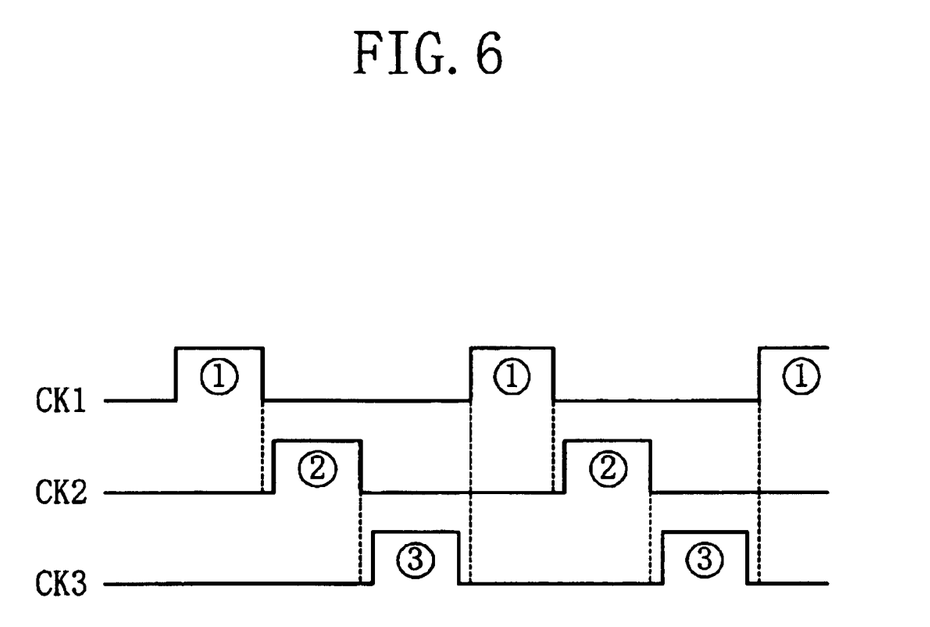
FIG. 6 is a timing chart illustrating synchronizing signals used in the magnetic field sensor according to the second embodiment of the present invention.

FIG. 6 is a timing chart illustrating a first synchronizing signal CK1, which triggers the detection of a magnetic field intensity by the magnetic field sensor of the second embodiment; a second synchronizing signal CK2 following the first synchronizing signal CK1; and a third synchronizing signal CK3 following the second synchronizing signal CK2.

First, in the first phase where the first synchronizing signal CK1 is ON while the second synchronizing signal CK2 and the third synchronizing signal CK3 are OFF (see FIG. 6), a first amplified voltage VH1, in proportion to the output voltage (Hall voltage) given from the Hall element 11, is generated at the output terminals of the voltage amplifier 12. At this time, the third switch circuit 18 is closed, whereby the first amplified voltage VH1 is held by the memory device 17.

Then, in the second phase where the second synchronizing signal CK2 is ON while the first synchronizing signal CK1 and the third synchronizing signal CK3 are OFF (see FIG. 6), the Hall element 11 outputs an Hall voltage through output terminals different from those used in the first phase, as selected by the first switch circuit 16. Thus, a second amplified voltage VH2, output from the voltage amplifier 12, is a voltage whose polarity is opposite to that of the first amplified voltage VH1. Moreover, the third switch circuit 18 transits to the open state. In this way, the first amplified voltage VH1 of the first phase having been held by the memory device 17, and the second amplified voltage VH2 of the second phase are added together to give a sum output voltage VH. By the action of the first switch circuit 16, the effective signal value of the sum output voltage VH is doubled because the effective signal components are in the same phase, and the offset signal components thereof are canceled out by each other because they are of the opposite phases. As a result, the sum output voltage VH is an accurate magnetic field detection value that includes neither the Hall element offset signal component, which is caused by, for example, a stress from an encapsulation package that encapsulates the magnetic field sensor, nor the amplifier input offset signal component.

Then, as in the first embodiment, the sum output voltage VH is received by the Schmitt trigger circuit 13 via the switch circuit 14. The Schmitt trigger circuit 13 detects either the north polarity or the south polarity, and outputs, to the logic latch circuit 15, the sum output voltage VH corresponding to the intensity of the detected magnetic field, as the output value that indicates whether or not the intensity of the detected magnetic field is greater than the intensity of the predetermined magnetic field. The output value is latched by the logic latch circuit 15 at the end of the second phase.

Then, in the third phase where the third synchronizing signal CK3 is ON while the first synchronizing signal CK1 and the second synchronizing signal CK2 are OFF (see FIG. 6), the voltage value VH of the first and second phases is applied to the Schmitt trigger circuit 13 while the polarity thereof is inverted by the second switch circuit 14 from that in the second phase. Therefore, the polarity of the detected magnetic field is opposite to that in the second phase. Moreover, the polarity of the predetermined magnetic field, which is determined in the Schmitt trigger circuit 13, is also inverted. Therefore, the intensity of the predetermined magnetic field is subjected to a comparison with the polarity thereof being opposite to that in the second phase. The output value from the Schmitt trigger circuit 13, which indicates the comparison result, is input to the logic latch circuit 15.

Then, in the logic latch circuit 15, the output values from the Schmitt trigger circuit 13 in the second and third phases, i.e., two output values indicating whether or not the intensity of the detected magnetic field is greater than that of the predetermined magnetic field for the north polarity and the south polarity, respectively, are subjected to an operation to obtain a desired output value. Therefore, at the end of the third phase, the operated value is latched, thus obtaining a binary output value that indicates whether or not the intensity of the detected magnetic field is greater than that of the predetermined magnetic field irrespective of the polarity of the magnetic field, as illustrated in FIG. 4.

As described above, in the second embodiment, the first switch circuit 16, the memory device 17 and the third switch circuit 18 are added to the configuration of the magnetic field sensor of the first embodiment, thereby reducing the circuit scale and the current consumption of the magnetic field sensor capable of a bipolar detection of a magnetic field intensity irrespective of the polarity of the magnetic field. Moreover, it is possible to reduce the scattering in the detected magnetic field which occur while the detected magnetic field is converted into a voltage and subjected to a comparison, due to the Hall element offset signal component, which is caused by, for example, a stress from a package that encapsulates the magnetic field sensor, and the amplifier input offset signal component.

An example of a specific configuration of the magnetic field sensor of the second embodiment will now be described.

Figure 7:
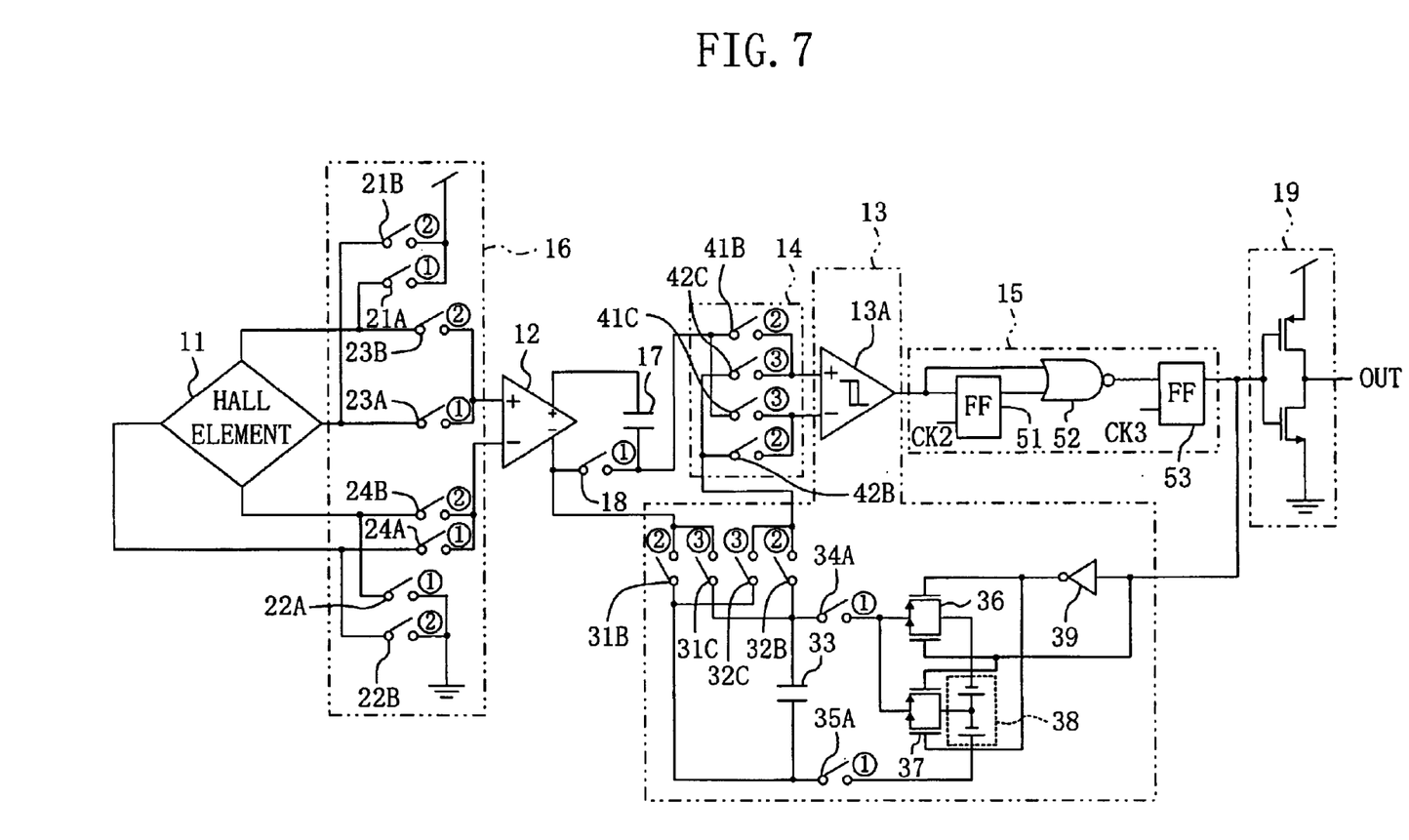
FIG. 7 is a circuit diagram illustrating a specific example of the magnetic field sensor according to the second embodiment of the present invention.

FIG. 7 schematically illustrates a circuit configuration of the magnetic field sensor according to the second embodiment of the present invention. In FIG. 7, like elements to those illustrated in FIG. 5 are denoted by like reference numerals. Herein, the memory device denoted by reference numeral 17 will be referred to as the "first memory device". The first switch circuit 16 includes a first switch 21A, a second switch 21B, a third switch 22A and a fourth switch 22B. The power supply voltage is applied to one end of each of the first switch 21A and the second switch 21B, and the other end of each of the first switch 21A and the second switch 21B is connected to an external terminal of the Hall element 11. One end of each of the third switch 22A and the fourth switch 22B is grounded, and the other end thereof is connected to an external terminal of the Hall element 11.

The first switch 21A is connected to a first external terminal located at the first apex among the four apexes of the Hall element 11, and is closed in synchronism with the first synchronizing signal CK1. The second switch 21B is connected to a second external terminal located at the second apex adjacent to the first apex of the Hall element 11, and is closed in synchronism with the second synchronizing signal CK2. The third switch 22A is connected to a third external terminal located at the third apex opposing the first apex of the Hall element 11, and is closed in synchronism with the first synchronizing signal CK1. The fourth switch 22B is connected to a fourth external terminal located at the fourth apex opposing the second apex of the Hall element 11, and is closed in synchronism with the second synchronizing signal CK2.

The first switch circuit 16 further includes a fifth switch 23A, a sixth switch 23B, a seventh switch 24A and an eighth switch 24B. The fifth switch 23A has one end connected to the second external terminal of the Hall element 11 and the other end connected to the positive phase terminal of the voltage amplifier 12, and is closed in synchronism with the first synchronizing signal CK1. The sixth switch 23B has one end connected to the first external terminal of the Hall element 11 and the other end connected to the positive phase input terminal of the voltage amplifier 12, and is closed in synchronism with the second synchronizing signal CK2. The seventh switch 24A has one end connected to the fourth external terminal of the Hall element 11 and the other end connected to the negative phase input terminal of the voltage amplifier 12, and is closed in synchronism with the first synchronizing signal CK1. The eighth switch 24B has one end connected to the third external terminal of the Hall element 11 and the other end connected to the negative phase input terminal of the voltage amplifier 12, and is closed in synchronism with the second synchronizing signal CK2.

The Schmitt trigger circuit 13 includes a trigger circuit main body 13A, a first switch 31B, a second switch 31C, a third switch 32B, a fourth switch 32C, a fifth switch 34A and a sixth switch 35A. The first switch 31B has one end connected to one electrode of a second memory device 33 made of a capacitor and the other end connected to the negative phase output terminal of the voltage amplifier 12, and is closed in synchronism with the second synchronizing signal CK2. The second switch 31C has one end connected to the other electrode of the second memory device 33 and the other end connected to the negative phase output terminal of the voltage amplifier 12, and is closed in synchronism with the third synchronizing signal CK3. The third switch 32B has one end connected to the other end of the second memory device 33 and the other end connected to the second switch circuit 14, and is closed in synchronism with second synchronizing signal CK2. The fourth switch 32C has one end connected to one electrode of the second memory device 33 and the other end connected to the second switch circuit 14, and is closed in synchronism with the third synchronizing signal CK3. The fifth switch 34A has one end connected to the other electrode of the second memory device 33 and the other end connected to a first MOS switch 36, and is closed in synchronism with the first synchronizing signal CK1. The sixth switch 35A has one end connected to one electrode of the second memory device 33 and the other end connected to a setting voltage source 38 for setting a hysteresis value (predetermined magnetic field), and is closed in synchronism with the first synchronizing signal CK1.

The Schmitt trigger circuit 13 further includes a second MOS switch 37 and a first inverter 39. The second MOS switch 37 has one end connected to one terminal of the first MOS switch 36 on the side closer to the fifth switch 34A and the other end connected to the setting voltage source 38. The first inverter 39 has an input terminal connected to the output terminal of the logic latch circuit 15, and an output terminal connected to the gate electrode of the PMOS of the first MOS switch 36 and to the gate electrode of the NMOS of the second MOS switch 37.

Moreover, the gate electrode of the NMOS of the first MOS switch 36 and the gate electrode of the PMOS of the second MOS switch 37 are connected to the output terminal of the logic latch circuit 15.

The second switch circuit 14 includes a first switch 41B, a second switch 41C, a third switch 42B and a fourth switch 42C. The first switch 41B has one end connected to the first memory device 17 and the other end connected to the positive phase input terminal of the trigger circuit main body 13A, and is closed in synchronism with the second synchronizing signal CK2. The second switch 41C has one end connected to the first memory device 17 and the other end connected to the negative phase input terminal of the trigger circuit main body 13A, and is closed in synchronism with the third synchronizing signal CK3. The third switch 42B has one end connected to the third switch 32B of the Schmitt trigger circuit 13 and the other end connected to the negative phase input terminal of the trigger circuit main body 13A, and is closed in synchronism with the second synchronizing signal CK2. The fourth switch 42C has one end connected to the third switch 32B of the Schmitt trigger circuit 13 and the other end connected to the positive phase input terminal of the trigger circuit main body 13A, and is closed in synchronism with the third synchronizing signal CK3.

The logic latch circuit 15 includes a first flip-flop 51, a 2-input NOR gate 52 and a second flip-flop 53. The first flip-flop 51 has its input terminal connected to the output terminal of the trigger circuit main body 13A, and receives the second synchronizing signal CK2 at its clock terminal. The 2-input NOR gate 52 receives the output signal from the trigger circuit main body 13A at one input terminal thereof, and receives the output signal from the first flip-flop 51 at the other input terminal thereof. The second flip-flop 53 receives the output signal from the 2-input NOR gate 52 at its input terminal, and receives the third synchronizing signal CK3 at its clock terminal.

A second inverter 19 as an output buffer for receiving the output signal from the second flip-flop 53 is connected in the stage following the logic latch circuit 15.

An operation of the magnetic field sensor having such a configuration will now be described.

First, in the first phase where the first synchronizing signal CK1 is ON while the second synchronizing signal CK2 and the third synchronizing signal CK3 are OFF (see FIG. 6), the first switch 21A, the third switch 22A, the fifth switch 23A and the seventh switch 24A of the first switch circuit 16 are closed, and the second switch 21B, the fourth switch 22B, the sixth switch 23B and the eighth switch 24B thereof are opened. Thus, the output voltage from the second and fourth external terminals of the Hall element 11 is input to the voltage amplifier 12. The output voltage from the voltage amplifier 12 at this time is used as the first amplified voltage VH1. In the first phase, the third switch circuit 18 is closed, whereby the first amplified voltage VH1 is held by the first memory device 17.

At this time, a hysteresis value corresponding to the external magnetic field is determined by the setting voltage source 38 in the Schmitt trigger circuit 13. The determined hysteresis value is received by the second memory device 33 through the fifth switch 34A and the sixth switch 35A and through the first MOS switch 36 or the second MOS switch 37.

Then, upon transition to the second phase where the second synchronizing signal CK2 is ON while the first synchronizing signal CK1 and the third synchronizing signal CK3 are OFF (see FIG. 6), the first switch 21A, the third switch 22A, the fifth switch 23A and the seventh switch 24A of the first switch circuit 16 are opened, and the second switch 21B, the fourth switch 22B, the sixth switch 23B and the eighth switch 24B thereof are closed. Thus, as opposed to the first phase, the output voltage from the first and third external terminals of the Hall element 11 is input to the voltage amplifier 12. Therefore, the second amplified voltage VH2 from the voltage amplifier is a voltage of the opposite polarity to the first amplified voltage VH1 of the first phase. Moreover, in this case, the third switch circuit 18 is opened, thereby obtaining the sum VH of the first amplified voltage VH1 of the first phase, which has been held by the first memory device 17, and the second amplified voltage VH2 of the second phase. As described above, the sum VH of the amplified voltages is an accurate magnetic field detection value that does not include the input offset signal component.

Then, the sum output voltage VH is received by the Schmitt trigger circuit 13 via the second switch circuit 14. At this time, the first switch 41B and the third switch 42B of the second switch circuit 14 are closed, and the second switch 41C and the fourth switch 42C thereof are open. Therefore, the polarity of the voltage amplifier 12 is the same as that of the trigger circuit main body 13A.

Moreover, the first switch 31B and the third switch 32B of the Schmitt trigger circuit 13 are closed, and the second switch 31C, the fourth switch 32C, fifth switch 34A and the sixth switch 35A thereof are open. Herein, the trigger circuit main body 13A detects either one of the polarities, and outputs, to the logic latch circuit 15, a sam of the output voltage VH corresponding to the intensity of the detected magnetic field, as a value that indicates whether or not the intensity of the detected magnetic field is greater than the intensity of the predetermined magnetic field. At this time, the voltage value corresponding to the predetermined magnetic field and having been held by the second memory device 33, is also input to the Schmitt trigger circuit 13.

Then, the output signal from the trigger circuit main body 13A is input to the first flip-flop 51 of the logic latch circuit 15. At the end of the second phase, the output signal is latched by the first flip-flop 51 and is also input to the 2-input NOR gate 52.

Then, upon transition to the third phase where the third synchronizing signal CK3 is ON while the first synchronizing signal CK1 and the second synchronizing signal CK2 are OFF (see FIG. 6), the first switch 41B and the third switch 42B of the second switch circuit 14 are opened, and the second switch 41C and the fourth switch 42C thereof are closed. Thus, as opposed to the second phase, the sum output voltage VH from the voltage amplifier 12 in the first and second phases is input to the Schmitt trigger circuit 13 while the polarity thereof is inverted. Therefore, the polarity of the detected magnetic field is opposite to that in the second phase.

Moreover, the second switch 31C and the fourth switch 32C of the Schmitt trigger circuit 13 are closed, and the first switch 31B, the third switch 32B, the fifth switch 34A and the sixth switch 35A thereof are open. In this way, the polarity of the predetermined magnetic field value, which is held by the second memory device 33, is also inverted, and thus a comparison can be made with the predetermined magnetic field having the opposite polarity to that in the second phase. Whereby, it is possible to obtain an output value that indicates the intensity of the detected magnetic field having the opposite polarity to that in the second phase. The output value is input to one of the input terminals of the 2-input NOR gate 52 that is not connected with the first flip-flop 51. In the 2-input NOR gate 52, the output values from the Schmitt trigger circuit 13 in the second and third phases, i.e., two output values indicating whether or not the intensity of the detected magnetic field is greater than that of the predetermined magnetic field for the north polarity and the south polarity, respectively, are subjected to an operation to obtain an output value.

Then, at the end of the third phase, the output value from the 2-input NOR gate 52 is latched by the second flip-flop 53, thus obtaining a binary output value that indicates whether or not the intensity of the detected magnetic field is greater than that of the predetermined magnetic field irrespective of the polarity of the magnetic field.

Note that the circuit configuration of the Schmitt trigger circuit 13 of the second embodiment may be applied to the Schmitt trigger circuit 13 of the first embodiment. Moreover, the circuit configuration of the second switch circuit 14 of the second embodiment may be applied to the switch circuit 14 of the first embodiment, and the circuit configuration of the logic latch circuit 15 of the second embodiment may be applied to the logic latch circuit 15 of the first embodiment.

What is claimed is:

1. A magnetic field sensor, comprising:

a Hall element;

a voltage amplifier for amplifying an output voltage from the Hall element so as to output an amplified signal, said voltage amplifier including a first and second output terminal;

a capacitor including a first and second electrode which are connected to the first and second output terminal, respectively;

a first switch circuit provided between one of the first and second output terminals and one of the first and second electrodes for being closed by an external signal in a first phase while being opened by an external signal in a second phase;

a voltage comparison circuit for receiving the amplified signal from both ends of the first switch circuit in the second phase;

a second switch circuit provided between the voltage amplifier and the voltage comparison circuit for inverting a polarity of the amplified signal; and a latch circuit for holding an output signal from the voltage comparison circuit, wherein the voltage comparison circuit inverts a polarity of a hysteresis voltage that determines a reference value of a magnetic field intensity in response to a first synchronizing signal, which triggers a detection of a magnetic field, and a second synchronizing signal following the first synchronizing signal.

2. A magnetic field sensor, comprising:

a Hall element;

a voltage amplifier for amplifying an output voltage from the Hall element so as to output an amplified signal;

a voltage comparison circuit for receiving the amplified signal;

a switch circuit provided between the voltage amplifier and the voltage comparison circuit for inverting a polarity of the amplified signal; and a latch circuit for holding an output signal from the voltage comparison circuit, wherein the voltage comparison circuit inverts a polarity of a hysteresis voltage that determines a reference value of a magnetic field intensity in response to a first synchronizing signal, which triggers a detection of a magnetic field, and a second synchronizing signal following the first synchronizing signal, wherein the latch circuit includes a first flip-flop circuit and a second flip-flop circuit for receiving binary values respectively in response to the first synchronizing signal and the second synchronizing signal, so as to hold an operated value as an output value, which is obtained by an operation on the binary values, in response to the second synchronizing signal.

3. A magnetic field sensor, comprising:

a Hall element including two pairs of external terminals;

a first switch circuit connected to the two pairs of external terminals for selecting one of the two pairs of external terminals as output terminals;

a voltage amplifier for amplifying an output voltage of the Hall element that is received via the first switch circuit and outputting an amplified signal;

a memory device for storing the amplified signal;

a second switch circuit provided between the voltage amplifier and the memory device for opening/closing a connection to the memory device;

a voltage comparison circuit for receiving the amplified signal;

a third switch circuit provided between the voltage amplifier and the voltage comparison circuit for inverting a polarity of the amplified signal; and a latch circuit for holding an output signal from the voltage comparison circuit, wherein: in response to a first synchronizing signal, which triggers a detection of a magnetic field, the first switch circuit selects one of the two pairs of external terminals of the Hall element as input terminals and the other one of the two pairs of external terminals of the Hall element as output terminals, with the second switch circuit being closed;

in response to a second synchronizing signal following the first synchronizing signal, the first switch circuit selects the one of the two pairs of external terminals of the Hall element as output terminals and the other one of the two pairs of external terminals of the Hall element as input terminals, with the second switch circuit being opened, thereby inputting to the voltage comparison circuit a sum of a first amplified signal, which has been stored in the memory device, and a second amplified signal from the voltage amplifier;

in response to a third synchronizing signal following the second synchronizing signal, the third switch circuit inverts a polarity of the sum of the first amplified signal and the second amplified signal; and the voltage comparison circuit inverts a polarity of a hysteresis voltage that determines a reference value of a magnetic field intensity in response to the second synchronizing signal and the third synchronizing signal as triggers.

4. The magnetic field sensor of claim 3, wherein the latch circuit includes a first flip-flop circuit and a second flip-flop circuit for receiving binary values respectively in response to the second synchronizing signal and the third synchronizing signal, so as to hold an operated value as an output value, which is obtained by an operation on the binary values, in response to the third synchronizing signal.

5. The magnetic field sensor of claim 3, wherein the memory device includes a capacitor.

* * * * *